United States Patent
Sumita

[11] 3,781,090
[45] Dec. 25, 1973

[54] FOUR LAYER ANTI-REFLECTION COATING

[75] Inventor: Haruki Sumita, Osaka, Japan

[73] Assignee: Minolta Camera Kabushiki Kaisha, Minami, Osaka, Japan

[22] Filed: Nov. 6, 1972

[21] Appl. No.: 304,140

[52] U.S. Cl.................. 350/164, 350/166, 117/33.3
[51] Int. Cl. .............................................. G02b 1/10
[58] Field of Search.......................... 350/164, 166; 117/33.3

[56] References Cited
UNITED STATES PATENTS
3,235,397  2/1966  Millendorfer..................... 350/164
3,565,509  2/1971  Sulzbach........................... 350/164

Primary Examiner—Ronald L. Wibert
Attorney—Harold L. Jackson et al.

[57] ABSTRACT

A multi-layered anti-reflection coating for use with a glass substrate includes four layers of material, the first layer furthest from the substrate having an optical thickness of a preselected design wavelength, $\lambda_0$, in the range of $0.260 \lambda_0 > N_1 d_1 > 0.230 \lambda_0$ and an index of refraction in the range of 1.35 to 1.62. The second layer having an optical thickness in the range of $0.520 \lambda_0 > N_2 d_2 > 0.400 \lambda_0$ and an index of refraction in the range of 2.00 to 2.30. The optical thickness of one of the third and fourth layers is in the range of $0.500 \lambda_0 > Nd > 0.250 \lambda_0$ while the optical thickness of the other layer of the third and fourth layers is in the range of $0.250 \lambda_0 > Nd > 0.060 \lambda_0$. The third layer has an index of refraction in the range of 1.56 to 1.72 and the fourth layer closest to the substrate has an index or refraction in the range of 1.35 to 1.62. The optical thicknesses of the layers can be varied to compensate for any variations from the theoretical design index of refractions.

20 Claims, 16 Drawing Figures

FIG_5_

FIG_6_

FOUR LAYER ANTI-REFLECTION COATING

BACKGROUND OF THE INVENTION

1. Field of the Invention

The present invention is directed to an anti-reflection coating for a substrate to minimize the reflectance of applied energy and more particularly, to four-layer anti-reflective optical coatings.

2. Description of the Prior Art

There have been numerous attempts to provide various anti-reflective coatings for reducing the reflection of energy off of a substrate. In recent years the primary emphasis in the optics field has been upon reducing the reflectance of light from glass substrates in the visible spectrum of 400 to 700 nanometers. A large number of solutions have been offered to decrease the Fresnel reflection of optically transparent material especially in optical lenses used in cameras and the like.

The use of a single and double layers of anti-reflecting coatings have become extremely popular. Since the visual spectrum extends over a relatively wide wavelength band, and a single layer is principally designed to nullify reflectance at a single design wavelength, its use has not provided satisfactory results over the entire visual region especially for low index glass having a refractive index from 1.45 to 1.9.

Three layer anti-reflection coatings such as in the U. S. Pat. No. 3,185,020 and U. S. Pat. No. 3,604,784 have greatly improved the desired optical characteristics over the single and double layer coatings. Generally the first layer next to the air is designed to minimize the reflectance and has a low refractive index with an optical thickness of one-quarter wavelength. As is well known to those skilled in the art, the optical thickness is the physical thickness multiplied by the index of refraction of the material. Generally the optical thickness is normally described in fractions of the wavelengths of the design light ray through which the coating is to be used. Frequently, the design wavelength will be picked as 510 nanometers.

In the normal three layer anti-reflection coating, the second layer will have a high refractive index, NH, and will be one-half wavelength in optical thickness. A half wavelength optical thickness does not alter the optical characteristics of the other layers and therefore has no effect on the residual reflectance; however, it will broaden or expand the anti-reflection effect of the total coating on both sides of the design wavelength. The last layer adjacent the substrate will have a medium refractive index, NM, and generally an optical thickness that will be of a three-quarter wavelength or one-quarter wavelength thickness. Generally, this third layer next to the substrate will act as a matching layer between the first two layers and the substrate in order to maintain the anti-reflection characteristic of the design.

The prior art has further utilized four layer anti-reflection coatings such as disclosed in U. S. Pat. No. 3,432,225 and U. S. Pat. No. 3,565,509. Generally these coatings have been designed to produce an equivalent thickness layer which consists of two or three thin layers that work as a half wavelength high refractive index or a quarter wavelength medium refractive index layer in the anti-reflection coating. Frequently, the individual layers will be extremely thin and very often only 300 angstroms thick. Manufacturing tolerance problems are a recurrent problem with the use of these thin individual layers and the final summation of their effect is simply to provide an equivalent quarter or half wavelength layer in the design.

Another approach has been to use two separate materials of different refractive indices that are co-evaporated to secure the arithmetic mean refractive index or a continuously changing refractive index with respect to the thickness. The continuously changing refractive index can be accomplished by changing the evaporation rate of the two materials with respect to the desired thickness. This method, for example, is disclosed in U. S. Pat. No. 3,176,574. As may be readily understood, this method requires precise control of evaporation material and technique.

The use of four layers of different evaporated materials provides superior results over that of the triple layer structure. An example of this four different material coating is disclosed in U. S. Pat. No. 3,463,574. Since it is necessary to use four materials, there are production problems relating to the evaporation and the precise control of the layer thickness and the design is still limited to various refractive index combinations corresponding to the substrate. In addition, the layered structure has a tendency to fractionalize and it is often found in production that the available material does not maintain or even correspond to its purported theoretical refractive index.

In the commercial production of anti-reflection coatings, a choice of material having a high or medium index of refraction generally requires a metal oxide which in commercial use is often found to be inhomogeneous and unstable in its refractive index. This is also true with high indexed fluorides such as $CeF_3$, $LaF_3$ and $NdF_3$.

In the U. S. Pat. No. 3,565,509 a multi-layer anti-reflection coating using a combination of only two materials is provided. This is accomplished by using a symmetrical array of layers to obtain an equivalent layer having an equivalent index of refraction and an equivalent thickness. The fundamental period must be symmetrical about the center of the period. The properties of the one period equivalent layer are such that in order to obtain the optimum anti-reflection band width, the thickness of the third layer from the substrate should be less than the sum of the thickness of the thin layer next to the substrate plus a half wavelength.

Basically, the designs of the anti-reflection coatings in the prior art have relied upon the classical solution utilizing a quarter wavelength system as represented by the Jupnik's solution, set forth in "Physics of Thin Film," volume 2, p.272, by G. Hass and R.E. Thun, Academic Press. Using this approach in a Jupnik four layer anti-reflection coating structure having for example, an optical thickness of $\lambda/4, \lambda/2, \lambda/4, \lambda/4$, their refractive indices must be proportionately represented by $N_1N_4=N_3\sqrt{N_sN_o}$ where $N$ represents the index of refraction and $N_4$ would be the index of refraction adjacent the substrate having an index of refraction of $N_s$. $N_o$ is the index of refraction of the medium such as air.

Other designs with the classical quarter wavelength structure produce similar restrictions that effect the utility and flexibility of an anti-reflective coating. In particular, material of high and middle refractive indices frequently have refractive indices that are not consistent and readily applicable to a production line technique.

In addition, the reflectance curves for various wavelengths are symmetrical with respect to $1/\lambda_0$, where $\lambda_0$ is the design wavelength. In the classical design, this produces a minimum reflection at $\lambda_0$ and at its integer magnified wavelengths, and any refractive index deviations cannot be adequately compensated by variations in the optical thickness.

SUMMARY OF THE INVENTION

The present invention provides a four layer anti-reflection coating which provides flexibility in varying optical thicknesses of the layers to compensate for deviations in the refractive indices particularly in the relatively high and medium indices ranges, that is indices generally having a value above 1.6. This is accomplished by providing a four-layer anti-reflection structure that is not limited to the restrictions of the classical quarter wavelength design but enables the optical thickness of the various layers to be altered as required to maintain the low reflectance that is theoretically possible with theoretical material having a consistent index of refraction.

The first layer of coating which is next to the medium, that is, generally the air coating inner face and the fourth layer which is next to the substrate, which is generally glass, will generally have a refractive index range between 1.35 and 1.62. Some of the materials which are capable of being utilized on the first and fourth layers with their refractive indices in parentheses are $MgF_2$ (1.385), $SiO_2$ (1.46), $ThF_4$ (1.5), $LaF_2$ (1.56), $Na_3(AlF_4)$ (1.35), $Al_2O_3$ (1.62), and $CeF_3$ (1.615). Other materials having the desired optical characteristics and a refractive index between 1.35 and 1.62 can also be utilized.

The second layer relative to the top of the anti-reflection coating has a relatively high refractive index generally equal to or between $NH = 2.00$ and 2.30. A number of materials can be utilized and illustrative of such materials are the following with their index of refraction in parentheses: $CeO_2$ (2.30 – 2.00), $ZrO_2$ (2.10 – 2.00), $TiO_2$ (2.30 – 2.00), $Ta_2O_5$ (2.30 – 2.00), ZnS (2.30 – 2.20), and $ThO_2$ (2.20 – 2.00).

Finally, the third layer from the top of the anti-reflection coating will have a refractive index equal to or between $NM = 1.72$ and 1.56, and illustrative of materials which can be utilized are the following with their index of refraction in parentheses: $Al_2O_3$ (1.65 – 1.56), MgO (1.72), $CeF_3$ (1.62), $LaF_3$ (1.59), $NdF_3$ (1.60), BeO (1.60), $ThOH_2$ (1.70), $InO_2$ (1.8–1.9) and a mixture of MgO and $Al_2O_3$ (1.72 – 1.65).

The range of optical thickness for the present invention is set forth as follows:

$0.260 \lambda_0 > N_1 d_1 > 0.230 \lambda_0$
$0.520 \lambda_0 > N_2 d_2 > 0.400 \lambda_0$
$0.500 \lambda_0 > N_3 d_3 > 0.060 \lambda_0$
$0.500 \lambda_0 > N_4 d_4 > 0.060 \lambda_0$ The optical thickness of the third and fourth layers are set forth in the above optical thickness table over their broad applicable range; however, as a result of the non-quarter design approach of the present invention, it is possible to offer alternative solutions or design parameters to the third and fourth layers that can be summarized as follows. When the third layer is thicker than $\lambda_0/4$ then the fourth layer will be thinner than $\lambda_0/4$, that is $0.500 \lambda_0 > N_3 d_3 > 0.250 \lambda_0$ and $0.250 \lambda_0 > N_4 d_4 > 0.060 \lambda_0$. In the alternative, when the third layer is thinner than $\lambda_0/4$, then the fourth layer will be thicker than $\lambda_0/4$, that is, $0.250 \lambda_0 > N_3 d_3 > 0.060 \lambda_0$ and $0.500 \lambda_0 > N_4 d_4 > 0.250 \lambda_0$.

While the specific embodiments of the present invention are illustrated in the visual spectrum range of 400 to 700 nanometers, it should be realized that the broad principles of the present invention are also applicable in the ultraviolet and infrared wavelength range with appropriate adjustments of the layer film materials, refractive indices and substrates.

DESCRIPTION OF THE PREFERRED EMBODIMENT

As may be appreciated by those skilled in the art, the use of various metal oxides and fluorides as optic coatings frequently do not have a stable refractive index nor a homogeneous structure. Solutions and compounds of these materials are subject to a number of variables such as the starting stoichiometric structure of the material, the equipment used and the evaporation techniques. In commercial production it is extremely difficult to maintain the precise and consistent control of the various layers of an anti-reflection coating to maintain the final result within the design parameters of the anti-reflection coating.

In contrast, a low index of refraction material such as $MgF_2$ has a relatively stable index of refraction of 1.385 even with film layer thicknesses thinner than $\lambda_0/2$ while also maintaining a homogeneous constituency.

The following derivations in conjunction with FIGS. 1 – 4 will help explain the advantages of the present invention over that of the classical quarter wave design utilized in the prior art.

In the following equations:

$\rho$ is the reflection coefficient and is a complex number from which the reflectance $R$ is derived as follows:

$$R = |\rho|^2.$$

Figure 1:
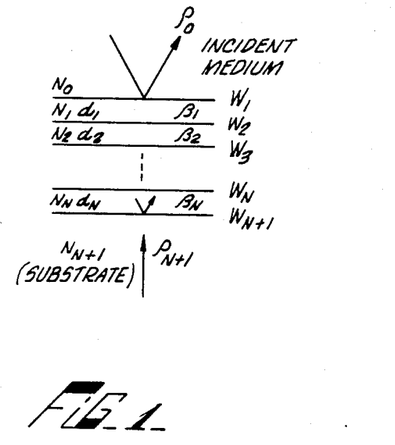
FIG. 1 is a schematic diagram of a hypothetical coating.
Figure 2:
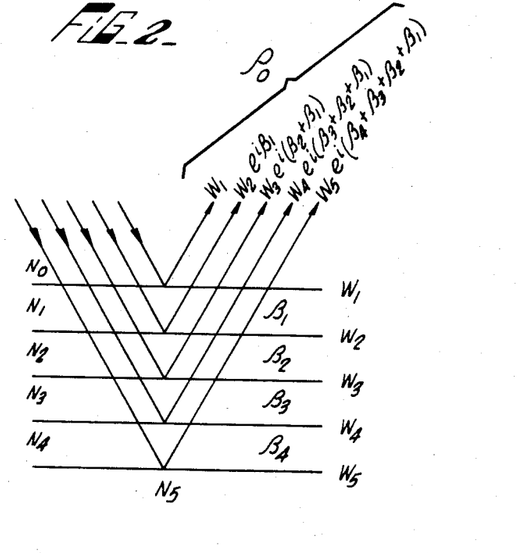
FIG. 2 is a schematic diagram of the reflections from a multi-layered coating.

$\beta$ is the phase factor due to the rays traveling through the layer twice as disclosed in FIG. 2, and is expressed by, $$\beta = 2 \cdot (2\pi/\lambda) Nd.$$

(1)

$N$ is the refractive index and $d$ is the physical thickness.

$W$ is the Fresnel coefficient at the boundary and is defined by, $$Wi = (Ni-1 - Ni)/(Ni-1 + Ni) \quad (2)$$

where the suffice $i$ represents integer number at the boundary of substrate $\rho_4 = W_5$. In case of Glass-Air Interface $|W|^2 \approx 0.04$, because the refractive index of the glass is assumed to be $N_s = 1.5$.

Now, $\rho_3$ is derived from the following recurrence formula, $$\rho_3 = (\rho_4 e^{i\beta_4} + W_4)/(1 + W_4 \rho_4 e^{i\beta_4}) \quad (3)$$

where $\rho_4 \approx 0.04$, $W_4 \approx 0.1$, therefore, the denominator in Equation (3) can be assumed to be 1 without introducing any significant error, whereby the final reflection coefficient $\rho_o$ can be written as $$\rho_o = W_5 e^{i(\beta_4+\beta_3+\beta_2+\beta_1)} + W_4 e^{i(\beta_3+\beta_2+\beta_1)} + W_3 e^{i(\beta_2+\beta_1)} + W_2 e^{i\beta_1} + W_1. \quad (4)$$

This equation is graphically represented in FIG. 2 where the reflected rays from the layer boundaries are simply added up and contribute to the total reflectance if we ignore any mutual interference effects.

Figure 3:
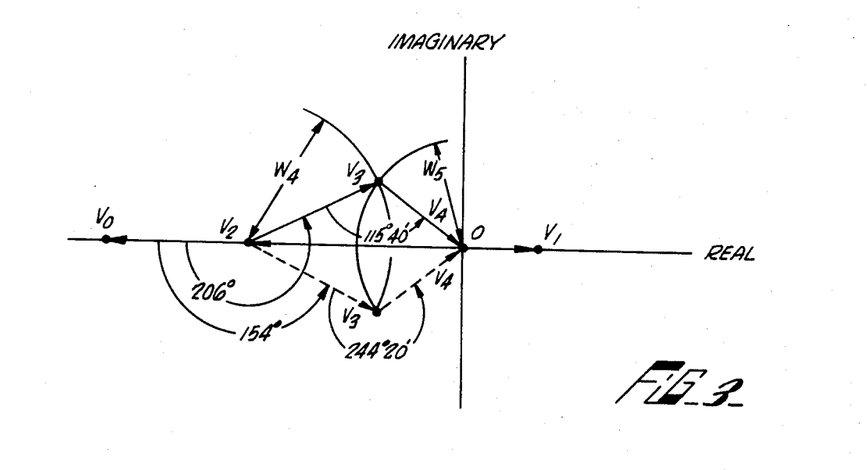
FIG. 3 is a vector diagram.

As can be seen in FIG. 3, every term can be considered as a vector, $V_0 \ldots V_4$. The summation of these vectors will give the final reflection coefficient $\rho_o$. If these vectors form a closed loop, the final reflection $\rho_o$ will be zero.

Figure 4:
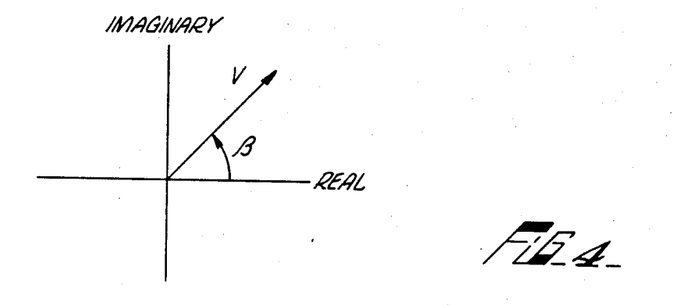
FIG. 4 is an example of the vector coordinate system.

This can be more easily understood when the vectors are shown in the complex plane. Referring to FIG. 4, the Absessa is the Real Axis and the phase angle $\beta$ is measured from this axis in a counter-clockwise direction.

In order to solve Equation (4) having a large number of variables, it is necessary to eliminate as many variables as possible, and accordingly the following assumptions are made:
1. The first coating layer next to the air or medium will contribute to the total anti-reflection effect and is set at, $N_1 d_1 = \lambda/4$.
2. The second coating layer will be utilized to increase wavelength band of the design and will be, $N_2 d_2 = \lambda/2$.

These assumptions produce the following phase factors:

$$\beta_1 = (4\pi/\lambda) N_1 d_1 = \pi,$$
$$\beta_2 = (4\pi/\lambda) N_2 d_2 = 2\pi. \quad (5)$$

Therefore, setting Equation (4) to the optimum condition of zero and substituting Equation (5) the equation is reduced to:

$$W_5 e^{i(\beta_4+\beta_3)} + W_4 e^{i\beta_3} + (W_3 + W_2 - W_1) = 0. \quad (6)$$

The solutions are $$\cos \beta_3 = (W_5^2 - (W_3+W_2-W_1)^2 - W_4^2)/(2W_4(W_3+W_2-W_1)), \quad (7)$$

$$\sin (\beta_3+\beta_4) = -(W_4/W_5) \sin \beta_3. \quad (8)$$

If we define the refractive index $W$'s as calculated by Equation (2), then $\beta_3$ can be obtained from Equation (7) and $\beta_4$ can be calculated from Equation (8).

The inventive design shown in TABLE 1 has been derived by this process with a substrate refractive index of $Ns = 1.52$.

The first layer is $N_1 = 1.385$ and $N_1 d_1 = \lambda/4$, and the second layer is $N_2 = 2.05$ and $N_2 d_2 = \lambda/2$.

If we choose $N_3 = 1.58$, $N_4 = 1.385$, then two solutions are obtained:

$$\beta_3 = (4\pi/\lambda) N_3 d_3 = 154° \quad \beta_3 = 206°$$

and $$\beta_4 = (4\pi/\lambda) N_4 d_4 = 244°20' \quad \beta_4 = 115° 40'$$

These solutions are shown in the Vector diagram of FIG. 3.

The length of each vector is related to the Fresnel coefficient which is a simple function of the refractive index. The direction $\beta$ of each vector is a function of the optical thickness. The vectors from each layer are shown by $V_0 \ldots V_4$.

If vector $V_4$ terminated at the origin 0, then we obtain $\rho_o = 0$ and thus $R = 0$.

If the first and the second layers have $\lambda/4$ thickness then $\beta_1$, and $\beta_2$ are the integer multiples of $\pi$, and therefore, vector $V_0$, $V_1$ and $V_2$ will be on the real axis.

Starting from vector $V_2$ on FIG. 3 to equate $\rho_o$ to zero, then vectors $V_3$ and $V_4$ must return to zero. These vectors have the respective Fresnel coefficients $W_4$ and $W_5$. Using a circle having a radius $W_4$ with its center at vector $V_2$, and another circle of radius $W_5$ with the center at 0, it is possible to find two intersections at a symmetrical position with respect to the real axis. If $V_2$ and 0 are respectively connected, we can define $V_3$ and $V_4$.

When these two circles intersect on the real axis there is only one solution, and the optical thickness will be $\lambda/4$ and $\lambda/4$. This is the classical Jupnik's solution, and the optical thickness structure will be $\lambda/4, \lambda/2, \lambda/4, \lambda/4$.

With the classical solution of the quarter wavelength system, the phase angle $\beta$ will be an integer multiple of $\pi$ and the vectors will terminate on the real axis only. The length of the vector is related to the Fresnel coefficient which in turn is a simple function of the refractive index, and is independent of the film thickness.

Therefore, in order to terminate the vector summation at the origin 0, the refractive indices of the coating will be restricted by the relationship $N_1 N_4 = N_3 \sqrt{N_s N_o}$. Variations of the classical solution will have other similar refractive index restrictions.

With the present invention we introduce a non-quarter structure for the third and fourth layers, and their vectors do not end on the real axis, but rather in the imaginary plane. The Fresnel coefficients can be adjusted by the phase angle in order to terminate the $V_4$ vector at the origin.

With the present invention two separate solutions are always possible to meet the design requirements, that is:

1. When the third layer is thicker than λ/4, then the fourth layer will be thinner than λ/4, and
2. when the third layer is thinner than λ/4, then the fourth layer will be thicker than λ/4.

As can be readily understood, the flexibility of the present invention in permitting optical thickness compensation to meet the design parameters provides the optical designer with a significant advancement in the art.

The explanation of the present invention to this point has been for any wavelength $\lambda_0$ to produce $\rho_0 = 0$. However, for our prime application in the visual spectrum, it is desirable to minimize the reflectance in as broad a range as possible, e.g., the entire visual spectrum range 400 ~ 700 nm.

Utilizing the above approximate solution, and a computer, the following designs were optimized. The technique utilized with the computer is the so-called damped least square method. That is to minimize the quantity defined by:

$$Q = \sum_{\lambda=400}^{\lambda=700} W(\lambda)[R(\lambda) - R^*(\lambda)]^2$$

where $W(\lambda)$ is a weighting factor, and $R^*(\lambda)$ is a target value of reflectance.

As an example of selection parameters that can be utilized:
$\lambda: 450 \sim 650^{nm}$, $R^*(\lambda) = 0$, and a large $W(\lambda)$.
$\lambda: 450 \sim 450^{nm}$ and $650 \sim 700^{nm}$, $R^*(\lambda) = 0.5$ percent, but having a small $W(\lambda)$.

Due to the non-quarter wavelength design, it is possible to compensate the reflectance with respect to refractive index variations by thickness adjustments of the layers of the third and fourth coating. While in any optical design there will be optimum values for a relatively high refractive index layer and a relatively middle range refractive index layer for a particular substrate it has been often found in practice that the particular materials are not available or practical commercially or the subsequent evaporated film layer will have an index of refraction which will fluctuate from the theoretical value. With the present invention, it is possible to compensate for these variations and produce a commercial anti-reflection coating.

A further advantage of the present invention is that its designs have three minimized reflections for a glass substrate with an index of refraction between 1.42 and 1.72 across the wavelength band of 400 to 700 nanometers. This inventive design permits the extreme edges of the wavelength band to have a minimal residual reflectance as compared to that of the prior art. This characteristic of the present invention is important particularly in color photography and also in wide angle photographic lenses. In a wide angle lens, when the incident angle increases, the reflectance will increase across the entire region and the reflectance curve with respect to the wavelength will shift towards a shorter wavelength.

Finally, the present invention can be accomplished with only three separate conventional materials.

The following examples are illustrative of the present invention:

TABLE 1

| Refractive Index | Optical Thickness (in design wavelength) |
|---|---|
| 1.000 | Incident light side medium |
| 1.385 | 0.250 |
| 2.050 | 0.510 |
| 1.580 | 0.333 |
| 1.385 | 0.089 |
| 1.520 | Substrate glass |

Figure 5:
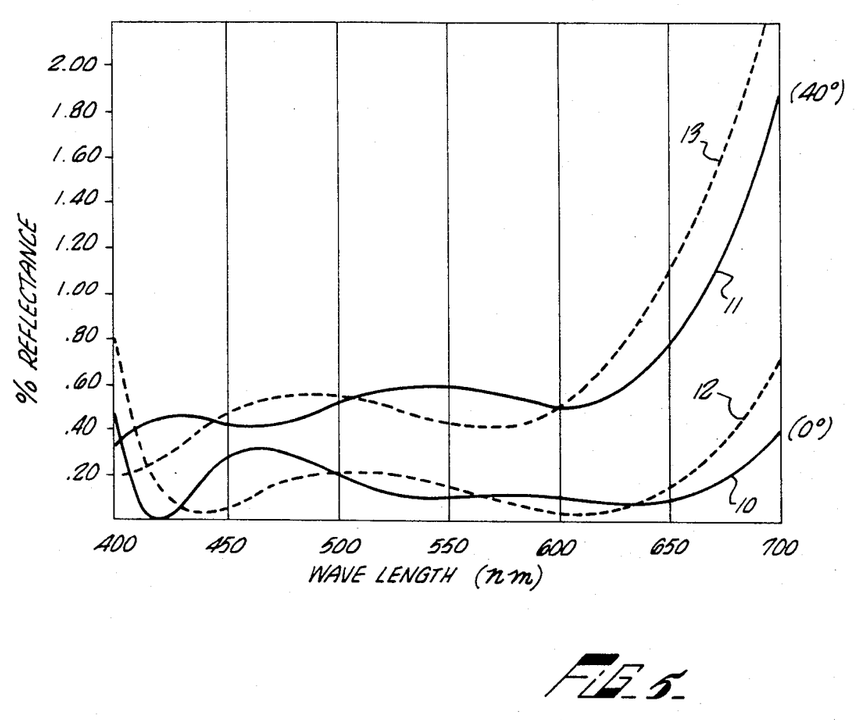
FIG. 5 is a graph showing the reflectance of an anti-reflection coating of TABLE 1 of this invention.

Referring to FIG. 5, a percent of reflectance versus wavelength curve is shown for the design in TABLE 1. Curve 10 is for a 0° incident angle while curve 11 is for a 40° incident angle.

The following TABLE 2 discloses a classical three layer coating design and is presented for comparison value:

TABLE 2

| Refractive Index | O.T. |
|---|---|
| 1.000 | Incident light side medium |
| 1.385 | 0.250 |
| 2.050 | 0.500 |
| 1.630 | 0.250 |
| 1.520 | Substrate glass |

In FIG. 5, line 12 represents the 0° incident angle curve for the design of TABLE 2 while line 13 represents the 40° incident angle curve for the same TABLE 2. It should be noted that the residual reflectance particularly at the longer wavelengths between 600 and 700 nanometers is considerably decreased with the design of TABLE 1 and this is of particular importance in color photography.

Figure 6:
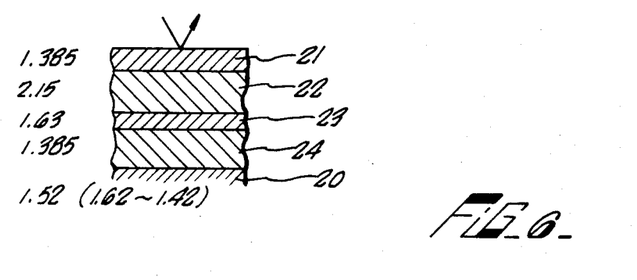
FIG. 6 is a cross section of the anti-reflection coating of TABLE 3.

A cross sectional diagram is disclosed in FIG. 6 showing a second embodiment of the present invention. In this design the substrate 20 can have an index of refraction that will vary from 1.42 to 1.62. The coating layers are shown successively as 21, 22, 23, and 24. The design parameters are set forth in the following TABLE 3.

TABLE 3

| Refractive Index | O.T. |
|---|---|
| 1.000 | Incident light side medium |
| 1.385 | 0.245 |
| 2.150 | 0.460 |
| 1.630 | 0.166 |
| 1.385 | 0.418 |
| 1.520 | Substrate glass |

Figure 7:
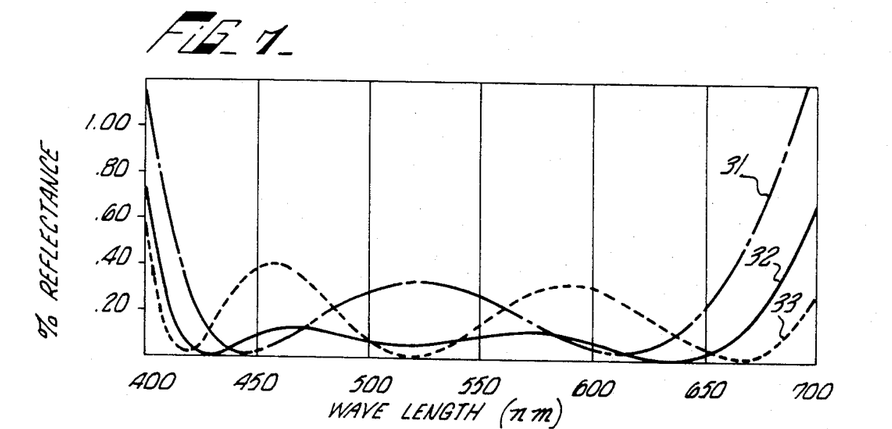
FIG. 7 is a reflectance graph of TABLE 3.

The reflectance curve of the second embodiment of the present invention disclosed in TABLE 3 and FIG. 6 is shown in FIG. 7 for various substrate indices. Curve 31 corresponds to a substrate $N_s$ 1.42; curve 32 corresponds to a substrate $N_s$ 1.52; and curve 33 corresponds to a substrate $N_s$ 1.62. The incident angle for each of the above curves is 0°. As can be seen from these curves, the residual reflectance is below 0.4 percent while at the extreme edge it is still below 1.4 percent.

Figure 8:
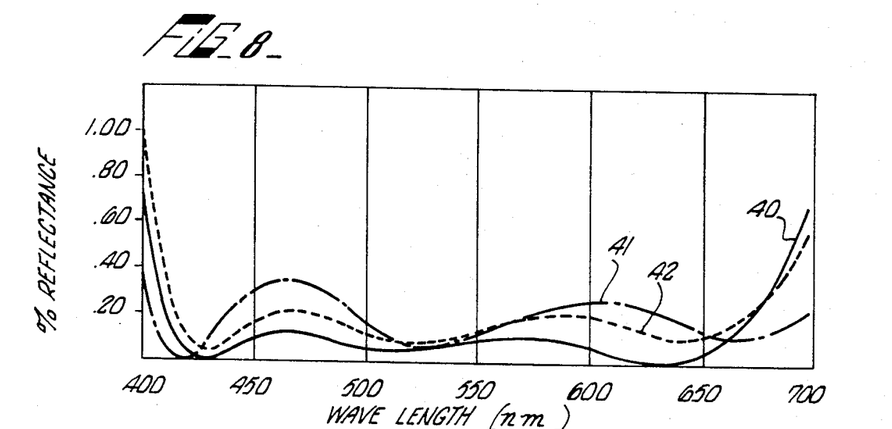
FIG. 8 is a reflectance graph of TABLES 4 and 5.

If the index of the relatively high (NH) layer is modified, that is the second layer, it is possible by changing the various thicknesses of the layers to maintain an acceptable anti-reflection coating. Referring to FIG. 8, the curve 32 of FIG. 7 is repeated as curve 40 where $N_2$ (NH) equals 2.15. Curve 41 is the resultant thickness compensated reflection curve when $N_2$ has been changed to 2.00. The adjusted thicknesses and the design parameters for the coating of curve 41 is disclosed in TABLE 4 below. Curve 42 is another thickness compensated reflection curve when $N_2$ has been changed to 2.30, the adjusted thicknesses and the design parameters are disclosed in TABLE 5.

TABLE 4

| R. I. | O. T. | Δd (change of thickness) |
|---|---|---|
| 1.000 | Medium incident side | |
| 1.385 | 0.241 | −0.004 |
| 2.000 | 0.442 | −0.018 |
| 1.630 | 0.173 | +0.007 |
| 1.385 | 0.455 | +0.037 |
| 1.520 | Substrate | |

TABLE 5

| R. I. | O. T. | Δd |
|---|---|---|
| 1.000 | Medium incident side | |
| 2.385 | 0.250 | +0.005 |
| 2.300 | 0.484 | +0.024 |
| 1.630 | 0.219 | +0.053 |
| 1.385 | 0.356 | −0.062 |
| 1.520 | Substrate | |

As can be seen from the above FIG. 8, even when the high refractive index layer is changed in its refractive index from an $NH = 2.00$ to a $NH = 2.30$, the present invention permits a four layer optical thickness adjustment that is capable of maintaining a low reflectance in the order of 0.35 percent across the general region of the spectrum and about a 1 percent reflectance at the extreme visual ends of the spectrum.

Figure 9:
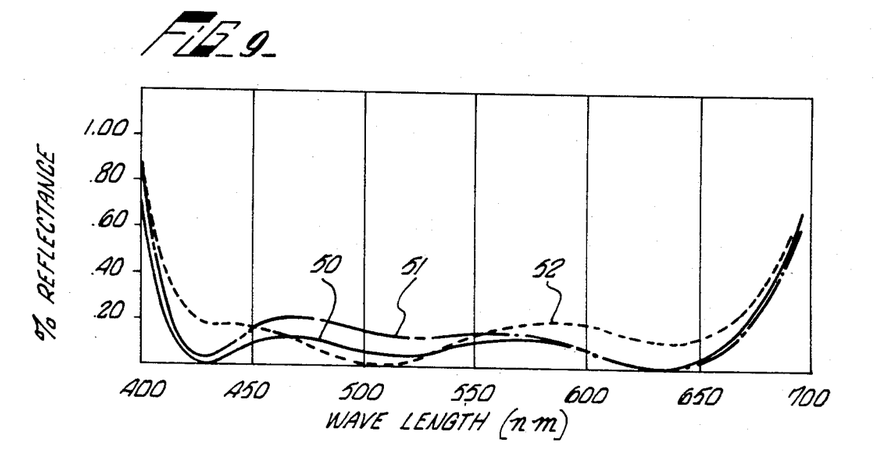
FIG. 9 is a reflectance graph of TABLES 6 and 7.

Referring to FIG. 9, an additional embodiment of the present invention is disclosed. Utilizing the design parameters presented in the above TABLE 3 and having the medium index layer or coating $N_3$ vary in its value from 1.63 to a new value of $NH = 1.56$ and further varying to $NM = 1.70$ it can be seen that the four layer coating thicknesses can still be adjusted to maintain the low residual reflectance of the original design In FIG. 9, curve 50 is equivalent to curve 32 of FIG. 7 with a $NM$ equal to 1.63. Curve 51 shows the resulting residual reflectance after a thickness adjustment of the four layers for $NM = 1.56$. The final design parameters and the adjustments are disclosed in TABLE 6 below. Curve 52 shows an additional adjustment when $NM = 1.70$ and the design parameters are presented in TABLE 7.

TABLE 6

| R. I | O. T. | Δd |
|---|---|---|
| 1.000 | Incident side medium | |
| 1.385 | 0.246 | +0.001 |
| 2.150 | 0.481 | +0.021 |
| 1.560 | 0.174 | +0.008 |
| 1.385 | 0.389 | +0.029 |
| 1.520 | Substrate | |

TABLE 7

| R. I. | O. T. | Δd |
|---|---|---|
| 1.000 | Incident side medium | |
| 1.385 | 0.243 | −0.002 |
| 2.150 | 0.430 | −0.030 |
| 1.700 | 0.186 | +0.020 |
| 1.385 | 0.433 | +0.015 |
| 1.520 | Substrate | |

Thus even while the refractive index of the layer in the medium range changes from a $NM$ of 1.56 to 1.70, the anti-reflection coating was still capable of maintaining a very low residual reflectance of less than 0.22 percent across the general region of the band width while at both ends of the visual spectrum the reflectance is kept within 1 percent due to the inherent flexibility of the design in permitting an adjustment in the thickness of the coating layers.

Figure 10:
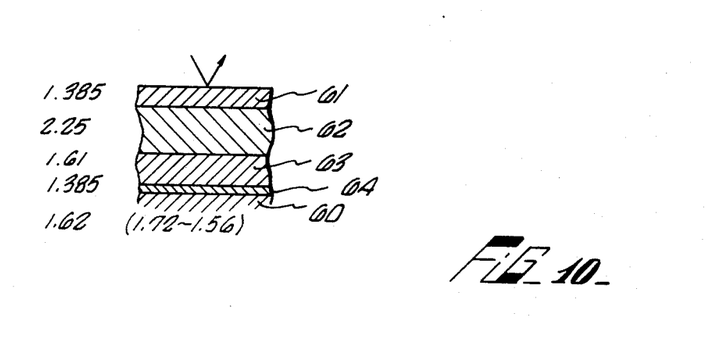
FIG. 10 is a cross section of the anti-reflection coating of TABLE 8.

A third embodiment of the present invention is disclosed in FIG. 10 and the parameters of the design are presented in TABLE 8 below. The substrate 60 can have a refractive index between 1.56 and 1.72 and the four layers of coatings are respectively numbered 61, 62, 63, and 64.

TABLE 8

| Refractive Index | O. T. |
|---|---|
| 1.000 | Incident side medium |
| 1.385 | 0.250 |
| 2.250 | 0.510 |
| 1.610 | 0.333 |
| 1.385 | 0.089 |
| 1.620 | Substrate |

Figure 11:
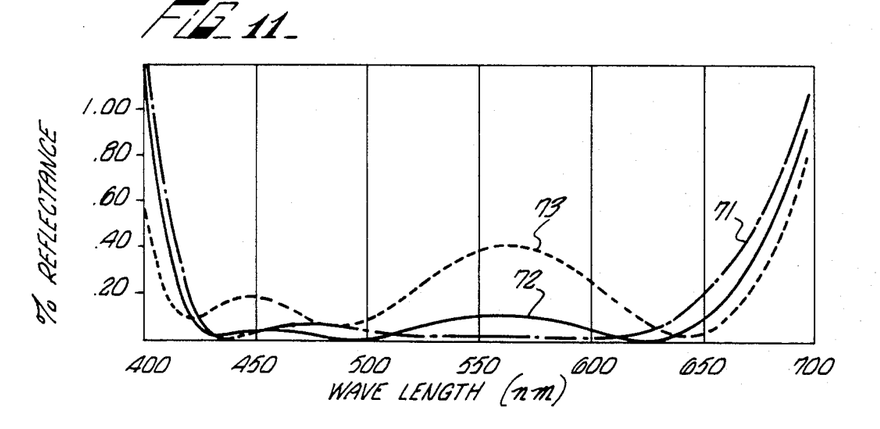
FIG. 11 is a reflectance graph of TABLE 8.

FIG. 11 discloses the percent of refraction with respect to wavelength for the design of TABLE 8. In FIG. 7, curve 71 corresponds to a substrate $N_s = 1.56$; curve 72 corresponds to $N_s = 1.62$; and curve 73 corresponds to $N_s = 1.72$. As can be seen, the residual reflections are about 0.4 percent across the broad central region of the visual spectrum and less than 1.6 percent at the extreme ends of the visual region even though a widely distributed substrate index was utilized.

Figure 12:
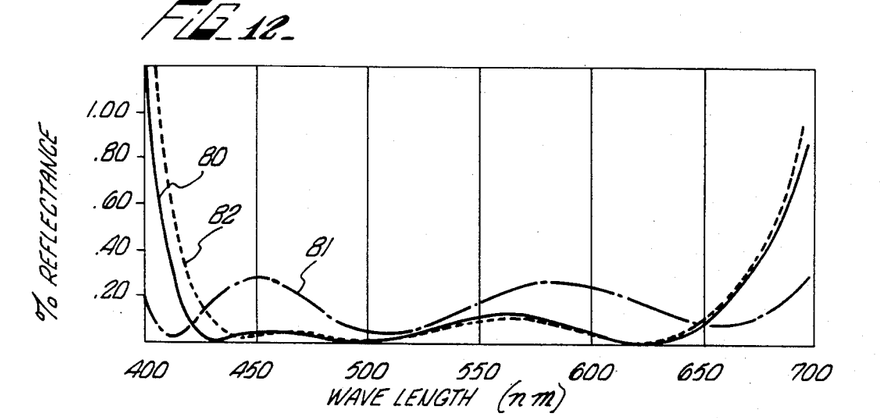
FIG. 12 is a reflectance graph of TABLES 9 and 10.

FIG. 12 discloses the percent of reflection after the coating design presented in TABLE 8 was modified to adjust for a change in index from a nominal value of $NH = 2.25$ to values of $NH = 2.05$ and $NH = 2.30$. Curve 80 corresponds to the value of $NH = 2.25$; curve 81 corresponds to $NH = 2.05$; and curve 82 corresponds to $NH = 2.30$. TABLE 9 presents the corrected design parameters associated with curve 81 while TABLE 10 discloses the design parameters associated with curve 82.

TABLE 9

| R. I. | O. T. | Δd |
|---|---|---|
| 1.000 | Incident side medium | |
| 1.385 | 0.249 | −0.001 |
| 2.050 | 0.509 | −0.001 |
| 1.610 | 0.347 | +0.014 |
| 1.385 | 0.074 | −0.015 |
| 1.620 | Substrate | |

TABLE 10

| R. I. | O. T. | Δd |
|---|---|---|
| 1.000 | Incident side medium | |
| 1.385 | 0.253 | +0.003 |
| 2.300 | 0.514 | +0.004 |
| 1.610 | 0.331 | −0.002 |
| 1.385 | 0.094 | +0.005 |
| 1.620 | Substrate | |

As can be seen from the above tables, when the high index $NH$ is changed from 2.05 to 2.30, the present invention still permits the residual reflectance to be maintained less then 0.28 percent across the general visual region, and at the longer wavelength reflectance is maintained at less then 1 percent and at the shorter wavelength of the spectrum it is still maintained within 2 percent by the appropriate adjustments in the thickness of the layers.

Figure 13:
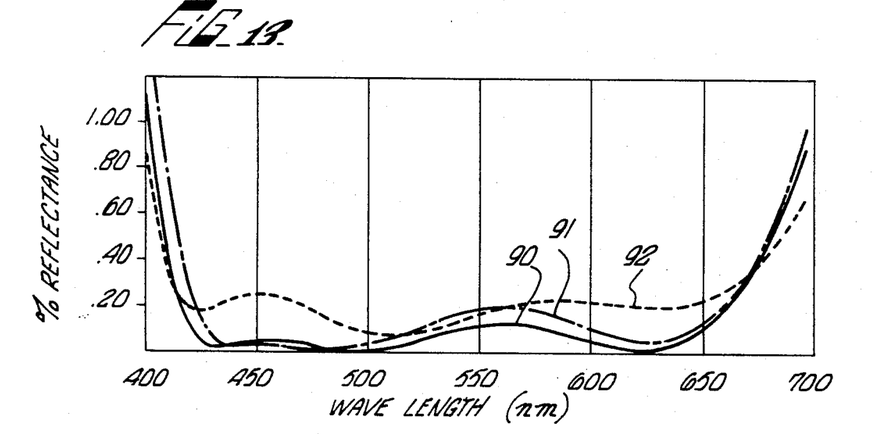
FIG. 13 is a reflectance graph of TABLES 11 and 12.

FIG. 13 discloses the effects of variations in a middle range index of refraction, $NM$, in the third embodiment presented in TABLE 8 above. If the original value of $NM$ equals 1.61, and it is modified to $NM = 1.57$ or to $NM = 1.70$, the residual reflectances can still be maintained approximately as low as the original design by appropriate adjustments in the thickness of the four layers. Referring to FIG. 13, curve 90 discloses the reflectance curve for $NM = 1.61$; curve 91 shows the reflectance curve when NM is modified to 1.57; and curve 92 shows the reflectance curve when NM is modified to 1.70. TABLE 11 below discloses the parameters associated with curve 91 while TABLE 12 below discloses the design parameters associated with curve 92.

TABLE 11

| R. I | O. T. | Δd |
|---|---|---|
| 1.000 | Incident side medium | |
| 1.385 | 0.253 | +0.003 |
| 2.250 | 0.513 | +0.003 |
| 1.570 | 0.336 | +0.003 |
| 1.385 | 0.094 | +0.005 |
| 1.620 | Substrate | |

TABLE 12

| R. I. | O. T. | Δd |
|---|---|---|
| 1.000 | Incident side medium | |
| 1.385 | 0.252 | +0.002 |
| 2.250 | 0.513 | +0.003 |
| 1.700 | 0.321 | −0.012 |
| 1.385 | 0.076 | −0.013 |
| 1.620 | Substrate | |

As can be seen from FIG. 13, the residual reflectance is kept under 0.25 percent across the general visual spectrum while at the longer wavelength end it is maintained below 1 percent and at the shorter wavelength end it is maintained within 1.8 percent by the appropriate adjustments in the thickness of the four layer coatings.

In order to more readily appreciate the advantages of the present invention over the prior art, TABLE 13 has been prepared disclosing a classical four layered structure design that is described in U. S. Pat. No. 3,463,574. The reflection characteristics of this antireflection four layer coating is disclosed in FIG. 14 as curve 100.

Figure 14:
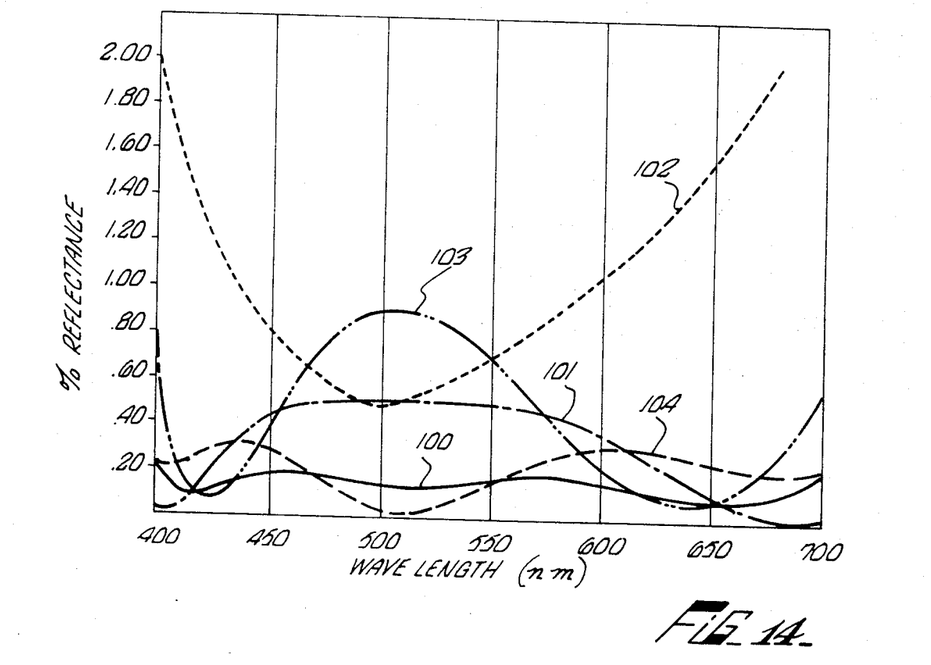
FIG. 14 is a reflectance graph of the coating of U. S. Pat. No. 3,463,574 shown in TABLE 13.

If one of the high index layers varies in its design refractive index from $NH = 2.07$ to $NH = 2.00$, the reflection curve will vary as shown in curve 101. In the alternative, if the same high index layer varies to $NH = 2.30$, the reflection curve is presented by curve 102.

TABLE 13

| Refractive Index | O. T. |
|---|---|
| 1.000 | Incident side medium |
| 1.380 | 0.250 |
| 2.070 | 0.250 |
| 2.190 | 0.250 |
| 1.730 | 0.250 |
| 1.510 | Substrate |

In the alternative, if the same TABLE 13 has its medium index layer NM equal to 1.73 varied respectively to 1.63 and 1.77, the corresponding reflection curves will be disclosed respectively by curve 103 and curve 104. A careful analysis of FIG. 14 discloses that the degree of reflection varies considerably with variations in the indices of the high and medium index of refraction layers. Due to the fundamental quarter wave optical thickness structure from which the optical design is derived, there are no variables left in the design to compensate for index variations by adjusting the thicknesses. For this reason, it is impossible to maintain the original reflectance design by compensating adjustments in the various layer thicknesses. This limitation should be compared with the above examples of the three embodiments of the present invention that disclose a flexibility of design to meet any variations in the indices of refraction which are quite common occurrences in production.

TABLE 14

| Refractive Index | O. T. |
|---|---|
| 1.000 | Incident side medium |
| 1.380 | 0.2500 |
| 2.080 | 0.5000 |
| 1.380 | 0.0606 |
| 2.080 | 0.0532 |
| 1.520 | Substrate |

Figure 15:
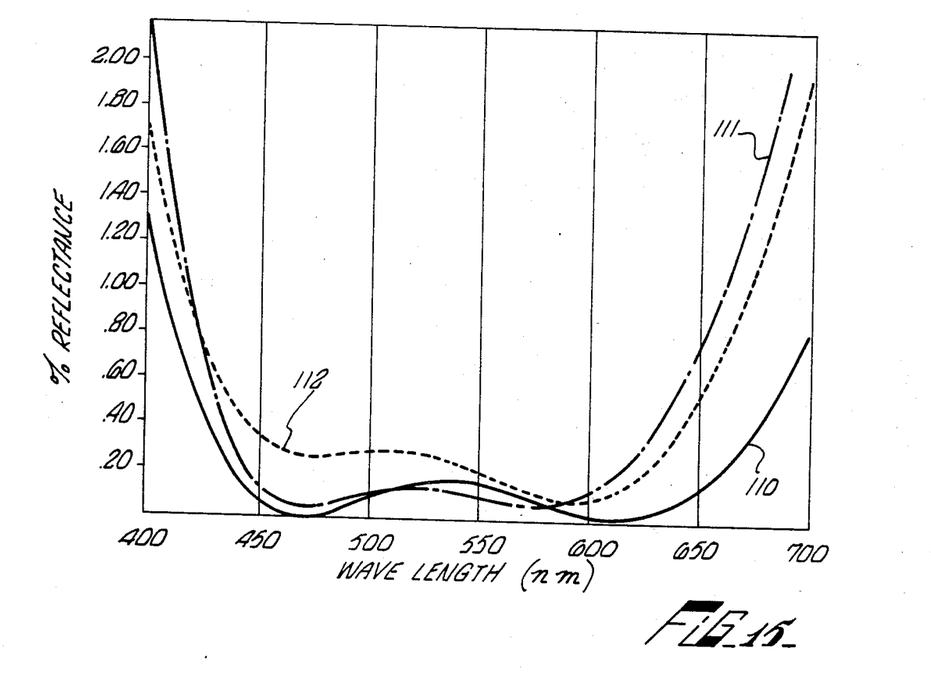
FIG. 15 is a reflectance graph of the coating of U. S. Pat. No. 3,432,225 shown in TABLE 14.

The above TABLE 14 presents the design parameters for the classical four layer anti-reflection coating disclosed in U. S. Pat. No. 3,432,225. It should be noted that this design configuration contains no medium index layer but relies only upon high and low index layers to produce the desired results. The reflectance curve for the design of TABLE 14 is shown in FIG. 15 as curve 110. If the second layer $NH = 2.08$ is changed to a refractive index of 2.30, the resultant reflectance curve is disclosed in FIG. 15 as curve 111. As can be seen from the curve, there is a drastic increase in percent of reflection at both ends of the visual spectrum. An effort was made using the non classical design theory of the present invention to widen the reflectance curve so that the reflectance mean reaches a minimum by adjusting the thickness of the coating. The optimum adjusted thickness that was computed by the non classical approach is shown as curve 112. However, as can be seen by comparing the curves, there was not any substantial improvement. The reason why the reflectance curve cannot be improved is that while the design may appear on the surface as a non quarter structure, it is effectively a triple layer classical design since the two layers next to the substrate layer work effectively as a single layer in the classical design.

A final third example of a prior art four layer antireflection coating is provided to further emphasize the value of the present invention.

TABLE 15

| Refractive Index | O. T. |
|---|---|
| 1.000 | Incident side medium |
| 1.380 | 0.2500 |
| 2.080 | 0.5290 |
| 1.380 | 0.0790 |
| 2.080 | 0.0581 |
| 1.520 | Substrate |

Figure 16:
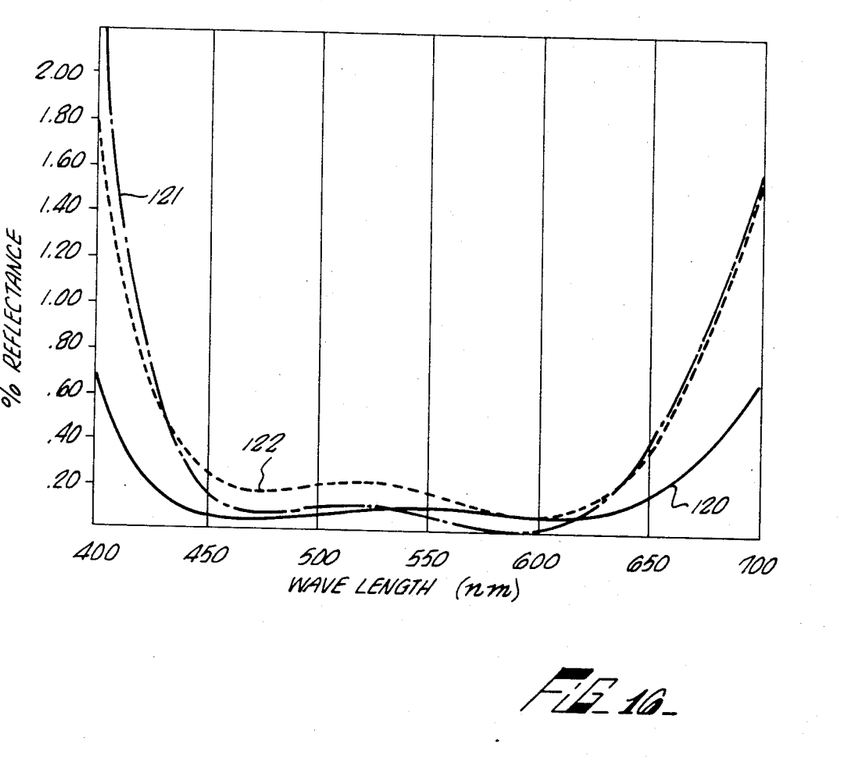
FIG. 16 is a reflectance graph of the coating of U. S. Pat. No. 3,565,509 shown in TABLE 15.

TABLE 15 discloses the design parameters of U. S. Pat. No. 3,565,509. Referring to FIG. 16, the reflectance curve of TABLE 15 is presented as curve 120. If the high index layer, that is the second layer $N_2$ with respect to the incoming light medium boundary has its refractive index modified to $NH = 2.30$, the resultant reflectance curve for TABLE 15 becomes curve 121. As a result of this variation in the index of refraction, the reflectance at the ends of the visual spectrum is remarkably increased. Again, since the structure has a superficial appearance of a non quarter wavelength structure, the optimum thickness was calculated on a computer using the non-classical approach in an attempt to minimize the mean reflectance and the results are disclosed by curve 122. The design in TABLE 15 again is basically a classical quarter wavelength three layer structure where one of the layers is replaced by an optically equivalent three layer configuration.

As can be seen in comparison with the above examples of the prior art, the present invention provides a new concept in designing four layer anti-reflective coatings by adopting a non quarter wavelength design approach that accommodates a remarkable degree of freedom in variations of the refractive index of the evaporated material and thereby provides a great advantage in the selection of evaporatable materials. In addition, it permits a permissible refractive index error during manufacturing while still permitting the production of a commercial coating.

A workable range of optical thicknesses within the broad design parameters of the present invention has been found to be:

$0.260 \lambda_0 > N_1 d_1 > 0.230 \lambda_0$
$0.520 \lambda_0 > N_2 d_2 > 0.400 \lambda_0$
$0.360 \lambda_0 > N_3 d_3 > 0.150 \lambda_0$
$0.470 \lambda_0 > N_4 d_4 > 0.060 \lambda_0$ In the present invention the first and fourth layers of coating will generally have a refractive index range between 1.35 and 1.62. Some of the materials which are capable of being utilized on the first and fourth layers with their refractive indices in parentheses are $MgF_2$ (1.385), $SiO_2$ (1.46), $ThF_4$ (1.5), $LaF_2$ (1.56), $Na_3(AlF_4)$ (1.35), $Al_2O_3$ (1.65 – 1.56), and $CeF_3$ (1.62).

The second layer relative to the top of the antireflection coating has a relatively high refractive index generally equal to or between $NH = 2.00$ and 2.30. A number of materials can be utilized and illustrative of such materials are the following with their index of refractions in parentheses: $CeO_2$ (2.30 – 2.00), $ZrO_2$ (2.10 – 2.00), $TiO_2$ (2.30 – 2.00), $Ta_2O_5$ (2.30 – 2.00), $ZnS$ (2.30 – 2.20), and $ThO_2$ (2.20 – 2.00).

Finally, the third layer from the top of the antireflection coating will have a refractive index equal to or between $NM = 1.72$ and 1.56, and illustrative of the materials which can be utilized are the following with their index of refraction in parentheses: $Al_2O_3$ (1.65 – 1.56), $MgO$ (1.72), $CeF_3$ (1.62), $LaF_3$ (1.59), $NdF_3$ (1.60), $BeO$ (1.60), $ThOH_2$ (1.70), $InO_2$ (1.8–1.9) and a mixture of $MgO$ and $Al_2O_3$ (1.72 – 1.65).

The optical thickness of the layer is normally described in fractions of wavelengths of the light for which the coating is to be used. The range of optical thickness for the present invention is set forth as follows:

$0.260 \lambda_0 > N_1 d_1 > 0.230 \lambda_0$
$0.520 \lambda_0 > N_2 d_2 > 0.400 \lambda_0$
$0.500 \lambda_0 > N_3 d_3 > 0.060 \lambda_0$
$0.500 \lambda_0 > N_4 d_4 > 0.060 \lambda_0$ where $N$ refers to the index of refraction and $d$ refers to the physical thickness while the sub number refers to the coating layer with the fourth layer being closest to the substrate and the first layer being furtherest away. The symbol $\lambda_0$ refers to the design wavelength which will be within the wavelength band of 400 to 700 nanometers and as an illustrative example may be 510 nanometers. The optical thickness of the third and fourth layers are set forth in the above optical thickness table over their broad applicable range; however, as a result of the non-quarter design approach of the present invention, it is possible to offer alternative solutions or design parameters to the third and fourth layers that can be summarized as follows. When the third layer is thicker than $\lambda_0/4$, then the fourth layer will be thinner than $\lambda_0/4$, that is $0.500 \lambda_0 > N_3 d_3 > 0.250 \lambda_0$ and $0.250 \lambda_0 > N_4 d_4 > 0.060 \lambda_0$. In the alternative, when the third layer is thinner than $\lambda_0/4$, then the fourth layer will be thicker than $\lambda_0/4$, that is $0.250 \lambda_0 > N_3 d_3 > 0.060 \lambda_0$ and $0.500 \lambda_0 > N_4 d_4 > 0.250 \lambda_0$.

The indices of refraction of the four layers and the substrate can be numerically related as follows: $N_1 = N_4 < N_s > N_3 < N_2$ where $N_1$ is the index of refraction of the coating layer furthest from the substrate and $N_s$ is the substrate index of refraction.

The coatings can be applied by a vacuum evaporation process.

While the above discloses the preferred embodiments of the present invention, it should be understood that various modifications are possible within the scope of this invention by workers skilled in the art and accordingly the invention should be measured solely from the following claims.

What is claimed is:

1. A multi-layered anti-reflection coating for use with a substrate to reduce reflectance of light comprising at least four layers of material, the first layer furthest from the substrate having an optical thickness of a preselected design wavelength, $\lambda_0$, in the range of $0.260 \lambda_0 > N_1 d_1 > 0.230 \lambda_0$ and an index of refraction in the range of 1.35 to 1.62; the second layer having an optical thickness in the range of $0.520 \lambda_0 > N_2 d_2 > 0.400 \lambda_0$ and an index of refraction in the range of 2.00 to 2.30; the optical thickness of one of the third and fourth layers is in the range of $0.500 \lambda_0 > N d > 0.250 \lambda_0$ while the optical thickness of the other layer of the third and fourth layers is in the range of $0.250 \lambda_0 > N d > 0.060 \lambda_0$, the third layer has an index of refraction in the range of 1.56 to 1.72 and the fourth layer closest to the substrate has an index of refraction in the range of 1.35 to 1.62 wherein $N$ refers to the index of refraction and $d$ refers to the physical thickness of the layer.

2. A multi-layered anti-reflection coating as in claim 1 wherein the substrate has an index of refraction of $N_s$ and the indices of refraction are related as follows, $N_1$ equals $N_4$ and $N_2$ is greater than $N_3$ and $N_s$.

3. A multi-layered anti-reflection coating as in claim 1 wherein the first and fourth coating layers are selected from the group consisting of $MgF_2$, $SiO_2$, $ThF_4$, $LaF_2$, $Na_3(AlF_4)$, $Al_2O_3$, and $CeF_3$.

4. A multi-layered anti-reflection coating as in claim 1 wherein the second coating layer is selected from the group consisting of $CeO_2$, $ZrO_2$, $TiO_2$, $Ta_2O_5$, $ZnS$ and $ThO_2$.

5. A multi-layered anti-reflection coating as in claim 1 wherein the third coating layer is selected from the group consisting of $Al_2O_3$, $MgO$, $CeF_3$, $LaF_3$, $NdF_3$, $BeO$, $InO_2$, $ThOH_2$ and a mixture of $MgO$ and $Al_2O_3$.

6. A multi-layered anti-reflection coating as in claim 1 wherein the first and fourth coating layer are selected from the group consisting of $MgF_2$, $SiO_2$, $ThF_4$, $LaF_2$, $Na_3(AlF_4)$, $Al_2O_3$, and $CeF_3$; the second coating layer is selected from the group consisting of $CeO_2$, $ZrO_2$, $TiO_2$, $Ta_2O_5$, $ZnS$ and $ThO_2$, and the third coating layer is selected from the group consisting of $Al_2O_3$, $MgO$, $CeF_3$, $LaF_3$, $NdF_3$, $BeO$, $InO_2$, $ThOH_2$ and a mixture of $MgO$ and $Al_2O_3$.

7. A multi-layered anti-reflection coating as in claim 6 wherein the substrate is a glass having an index of refraction $N_s$ in the range of 1.42 to 1.72.

8. A multi-layered anti-reflection coating for use with a substrate to reduce reflection of energy comprising four layers of material, each layer having an optical thickness of a preselected design wavelength $\lambda_0$ as follows:

$0.260 \lambda_0 > N_1 d_1 > 0.230 \lambda_0$
$0.520 \lambda_0 > N_2 d_2 > 0.400 \lambda_0$
$0.500 \lambda_0 > N_3 d_3 > 0.060 \lambda_0$
$0.500 \lambda_0 > N_4 d_4 > 0.060 \lambda_0$ wherein $N$ refers to the index of refraction and $d$ refers to the physical thickness of the layer, the subnumbers corresponding to the layers with $N_1 d_1$ being the layer furthest from the substrate, the optical thickness of the layers being adjustable to compensate for variations from any design $N$ whereby the design reflectance is maintained.

9. A multi-layered anti-reflection coating as in claim 8 wherein the substrate has an index of refraction of $N_s$ and the indices of refraction are related as follows, $N_1$ equals $N_4$ and $N_2$ is greater than $N_3$ and $N_s$.

10. A multi-layered anti-reflection coating as in claim 8 wherein the substrate has an index of refraction of $N_s$ and the indices of refraction are related as follows:

$$N_1 = N_4 < N_s > N_3 < N_2.$$

11. A multi-layered anti-reflection coating as in claim 8 wherein the first layer furtherest from the substrate and the fourth layer adjacent the substrate have an index of refraction in the range of 1.35 to 1.62, the second layer has an index of refraction in the range of 2.00 to 2.30 and the third layer has an index of refraction in the range of 1.56 to 1.72.

12. A multi-layered anti-reflection coating as in claim 8 wherein the optical thickness of the third and fourth layers are as follows:

$0.500 \lambda_0 > N_3 d_3 > 0.250 \lambda_0$
$0.250 \lambda_0 > N_4 d_4 > 0.060 \lambda_0$.

13. A multi-layered anti-reflection coating as in claim 8 wherein the optical thickness of the third and fourth layers are as follows:

$0.250 \lambda_0 > N_3 d_3 > 0.060 \lambda_0$
$0.500 \lambda_0 > N_4 d_4 > 0.250 \lambda_0$.

14. A multi-layered anti-reflection coating as in claim 8 wherein the optical thickness of the third and fourth layers are as follows:

$0.360 \lambda_0 > N_3 d_3 > 0.150 \lambda_0$
$0.470 \lambda_0 > N_4 d_4 > 0.060 \lambda_0$.

15. multi-layered anti-reflection coating as in claim 8 wherein the first and fourth layers are magnesium fluoride.

16. A multi-layered anti-reflection coating as in claim 8 wherein the first and fourth coating layers are selected from the group consisting of $MgF_2$, $SiO_2$, $ThF_4$, $LaF_2$, $Na_3(AlF_4)$, $Al_2O_3$, and $CeF_3$.

17. A multi-layered anti-reflection coating as in claim 8 wherein the second coating layer is selected from the group consisting of $CeO_2$, $ZrO_2$, $TiO_2$, $Ta_2O_5$, $ZnS$ and $ThO_2$.

18. A multi-layered anti-reflection coating as in claim 8 wherein the third coating layer is selected from the group consisting of $Al_2O_3$, $MgO$, $CeF_3$, $LaF_3$, $NdF_3$, $BeO$, $InO_2$, $ThOH_2$ and a mixture of $MgO$ and $Al_2O_3$.

19. A multi-layered anti-reflection coating as in claim 8 wherein the first and fourth coating layers are selected from the group consisting of $MgF_2$, $SiO_2$, $ThF_4$, $LaF_2$, $Na_3(AlF_4)$, $Al_2O_3$, and $CeF_3$; the second coating layer is selected from the group consisting of $CeO_2$, $ZrO_2$, $TiO_2$, $Ta_2O_5$, $ZnS$ and $ThO_2$, and the third coating layer is selected from the group consisting of $Al_2O_3$, $MgO$, $CeF_3$, $LaF_3$, $NdF_3$, $BeO$, $InO_2$, $ThOH_2$ and a mixture of $MgO$ and $Al_2O_3$.

20. A multi-layered anti-reflection coating as in claim 8 wherein the substrate is a glass having an index of refraction $N_s$ in the range of 1.42 to 1.72.

* * * * *